US012627851B2

(12) United States Patent
Zhuo et al.

(10) Patent No.: US 12,627,851 B2
(45) Date of Patent: May 12, 2026

(54) LIVE STREAMING CONTENT DISPLAY METHOD AND APPARATUS, DEVICE, AND STORAGE MEDIUM

(71) Applicant: Beijing Zitiao Network Technology Co., Ltd., Beijing (CN)

(72) Inventors: Yaqin Zhuo, Beijing (CN); Yuyang Chen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/750,907

(22) Filed: Jun. 21, 2024

(65) Prior Publication Data

US 2024/0348864 A1      Oct. 17, 2024

Related U.S. Application Data

(63) Continuation of application No. PCT/CN2022/133812, filed on Nov. 23, 2022.

(30) Foreign Application Priority Data

Dec. 21, 2021      (CN) .......................... 202111572649.7

(51) Int. Cl.
*H04N 21/431*          (2011.01)
*H04N 21/2187*        (2011.01)
*H04N 21/478*          (2011.01)

(52) U.S. Cl.
CPC ..... *H04N 21/4316* (2013.01); *H04N 21/2187* (2013.01); *H04N 21/47815* (2013.01)

(58) Field of Classification Search
CPC ........... H04N 21/4316; H04N 21/2187; H04N 21/47815
See application file for complete search history.

(56) References Cited

U.S. PATENT DOCUMENTS 11,051,067 B1 *   6/2021   Baxter ............... H04N 21/8586
11,589,128 B1 *   2/2023   Greiner .............. G06Q 30/0633
(Continued)

FOREIGN PATENT DOCUMENTS

CN          103335644 A      10/2013
CN          105141509 A      12/2015
(Continued)

OTHER PUBLICATIONS

China National Intellectual Property Administration, Office Action and Search Report Issued in Application No. 202111572649.7, Jun. 29, 2023, 16 pages.
(Continued)

*Primary Examiner* — Chenea Davis
(74) *Attorney, Agent, or Firm* — Alleman Hall LLP

(57)          ABSTRACT

The present disclosure provides a live streaming content display method and apparatus, a device, and a storage medium. The method comprises: obtaining a first target object currently displayed in or associated with live streaming content, location information respectively corresponding to at least one second target object associated with the first target object; on the basis of the location information respectively corresponding to the at least one second target object associated with the first target object, determining the distance of a nearest second target object from the current watching user; and then displaying, on a playing interface of the live streaming content, the distance of the nearest second target object from the current watching user and/or the nearest second target object.

13 Claims, 4 Drawing Sheets

(56) References Cited

U.S. PATENT DOCUMENTS

| | | | |
|---|---|---|---|
| 2005/0159974 A1 | 7/2005 | Moss et al. | |
| 2005/0160014 A1* | 7/2005 | Moss ................. | G06Q 30/0259 |
| | | | 705/26.61 |
| 2006/0259574 A1 | 11/2006 | Rosenberg | |
| 2011/0106657 A1* | 5/2011 | Yu ....................... | G06F 16/9537 |
| | | | 705/26.9 |
| 2015/0120767 A1* | 4/2015 | Skeen ................ | H04N 21/4725 |
| | | | 707/754 |
| 2017/0353769 A1 | 12/2017 | Husain et al. | |
| 2021/0097593 A1* | 4/2021 | Rosenfeld .......... | G06Q 30/0641 |
| 2021/0144452 A1 | 5/2021 | Cutaia et al. | |
| 2023/0057821 A1* | 2/2023 | Marzorati .............. | H04L 51/02 |
| 2023/0063711 A1 | 3/2023 | Liu et al. | |
| 2024/0126413 A1 | 4/2024 | Zheng et al. | |

FOREIGN PATENT DOCUMENTS

| | | | |
|---|---|---|---|
| CN | 110881132 A | 3/2020 | |
| CN | 111738801 A | 10/2020 | |
| CN | 112040250 A | 12/2020 | |
| CN | 113014934 A | 6/2021 | |
| CN | 113450400 A | 9/2021 | |
| CN | 113469779 A | 10/2021 | |
| CN | 113608651 A | 11/2021 | |
| CN | 113807914 A | 12/2021 | |
| CN | 114268803 A | 4/2022 | |
| GB | 2607331 A | 12/2022 | |
| JP | 2004200932 A | 7/2004 | |
| JP | 2016057953 A | 4/2016 | |

OTHER PUBLICATIONS

ISA China National Intellectual Property Administration, International Search Report Issued in Application No. PCT/CN2022/133812, Feb. 8, 2023, WIPO, 5 pages.

Qiu, M., "Innovative scenario-based thinking enhances user added value," Youdao, Available Online at https://m.xjzb.com/Article/519841/1_2_55_60/0/053FCC206580/Article.aspx, Aug. 4, 2016, 4 pages.

European Patent Office, Extended European Search Report Issued in Application No. 22909637.5, Feb. 11, 2025, Germany, 8 pages.

Japan Patent Office, Office Action Issued in Application No. 2024-538254, Jan. 21, 2025, 11 pages.

* cited by examiner

LIVE STREAMING CONTENT DISPLAY METHOD AND APPARATUS, DEVICE, AND STORAGE MEDIUM

CROSS-REFERENCE TO RELATED APPLICATIONS

This application is a continuation application from International Patent Application No. PCT/CN2022/133812, which claims the benefit of priority from the Chinese patent application No. 202111572649.7, entitled "LIVE STREAMING VIDEO DISPLAY METHOD AND APPARATUS, DEVICE, AND STORAGE MEDIUM" and filed on Dec. 21, 2021, the contents of both of which are hereby incorporated by reference in their entirety into the present application.

TECHNICAL FIELD

The present disclosure relates to the field of data processing, in particular to a live streaming content display method and apparatus, device, and storage medium.

BACKGROUND

With the continuous development of live streaming technology, people's demands for functions relevant to live streaming channels are becoming increasingly diverse, especially for live streaming interface presenting manners and contents closely related to people's watching experiences.

SUMMARY

In an aspect, the present disclosure provides a live streaming content display method, comprising: displaying a playing interface for live streaming content; obtaining a first target object currently presented in the live streaming content or associated with the live streaming content, location information respectively corresponding to at least one second target object associated with the first target object; determining a distance between the current watching user and a nearest second target object based on the location information respectively corresponding to the at least one second target object associated with the first target object; wherein, the nearest second target object is one of the at least one second target object associated with the first target object located closest to the current watching user; presenting, on the playing interface of the live streaming content, the distance between the current watching user and the nearest second target object and/or the nearest second target object.

In an optional implementation, the method further comprises: when it is determined that an object currently presented in or associated with the live streaming content is switched from the first target object to a third target object, presenting, on the playing interface of the live streaming content, a distance between the current watching user and a nearest fourth target object associated with the third target object and/or the nearest fourth target object.

In an optional implementation, the presenting, on the playing interface of the live streaming content, the distance between the current watching user and the nearest second target object and/or the nearest second target object, comprises: presenting, on a first control preset on the playing interface of the live streaming content, the distance between the current watching user and the nearest second target object and/or the nearest second target object.

In an optional implementation, the method further comprises: in response to a triggering operation on the first control, presenting, on the playing interface of the live streaming content, the distances of the at least one second target object associated with the first target object from the current watching user, and the location information of a corresponding second target object.

In an optional implementation, the presenting, on the playing interface of the live streaming content, the distances of the at least one second target object associated with the first target object from the current watching user and the corresponding location information of the second target object, comprises: presenting, on the playing interface of the live streaming content, the distances of the at least one second target object associated with the first target object from the current watching user, and the corresponding location information of the second target object in an ascending order of distance.

In an optional implementation, the presenting, on the playing interface of the live streaming content, the distance between the current watching user and the nearest second target object and/or the nearest second target object, comprises: presenting, on a live room interface or a preview interface of the live streaming content, the distance between the current watching user and the nearest second target object and/or the nearest second target object.

In an optional implementation, the method further comprises: presenting the number of the second target objects associated with the first target object on the playing interface of the live streaming content.

In an optional implementation, the method further comprises: presenting, on the playing interface of the live streaming content, a second target object corresponding to a user initiating the live streaming content and/or the distance between the second target object and the current watching user.

In another aspect, the present disclosure provides a display apparatus for live streaming content, comprising: a display module for displaying a playing interface of the live streaming content; a first acquisition module for obtaining a first target object currently presented in or associated with the live streaming content, and location information respectively corresponding to at least one second target object associated with the first target object; a first determination module for determining the distance between the current watching user and a nearest second target object based on the location information respectively corresponding to the at least one second target object associated with the first target object; wherein, the nearest second target object is a second target object located closest to the current watching user among the at least one second target object associated with the first target object; a first presenting module for presenting, on the playing interface of the live streaming content, the distance between the current watching user and the nearest second target object and/or the nearest second target object.

In another aspect, the present disclosure provides a non-transitory computer-readable storage medium with instructions stored therein which, when being executed on a terminal device, cause the terminal device to implement the method disclosed herein.

In another aspect, the present disclosure provides an device comprising: a memory, a processor, and a computer program stored in the memory and executable on the processor which, when being executed by the processor, implement the method disclosed herein.

In another aspect, the present disclosure provides a computer program product comprising computer programs/instruction which, when executed by a processor, implement the method disclosed herein.

In another aspect, the present disclosure provides a computer program comprising computer instructions which, when executed by a processor, implement the method disclosed herein.

BRIEF DESCRIPTION OF THE DRAWINGS

The accompanying drawings herein are incorporated into this description and form a part of this description, illustrating embodiments of the present disclosure and explaining the principles of the present disclosure together with this description.

In order to provide a clearer explanation of the technical solutions in the embodiments of the present disclosure or the related art, a brief introduction will be given below to the accompanying drawings required by the embodiments or the related art. It is apparent for those skilled in the art that other drawings can be obtained based on these accompanying drawings without creative efforts.

DETAILED DESCRIPTION

Figure 1:
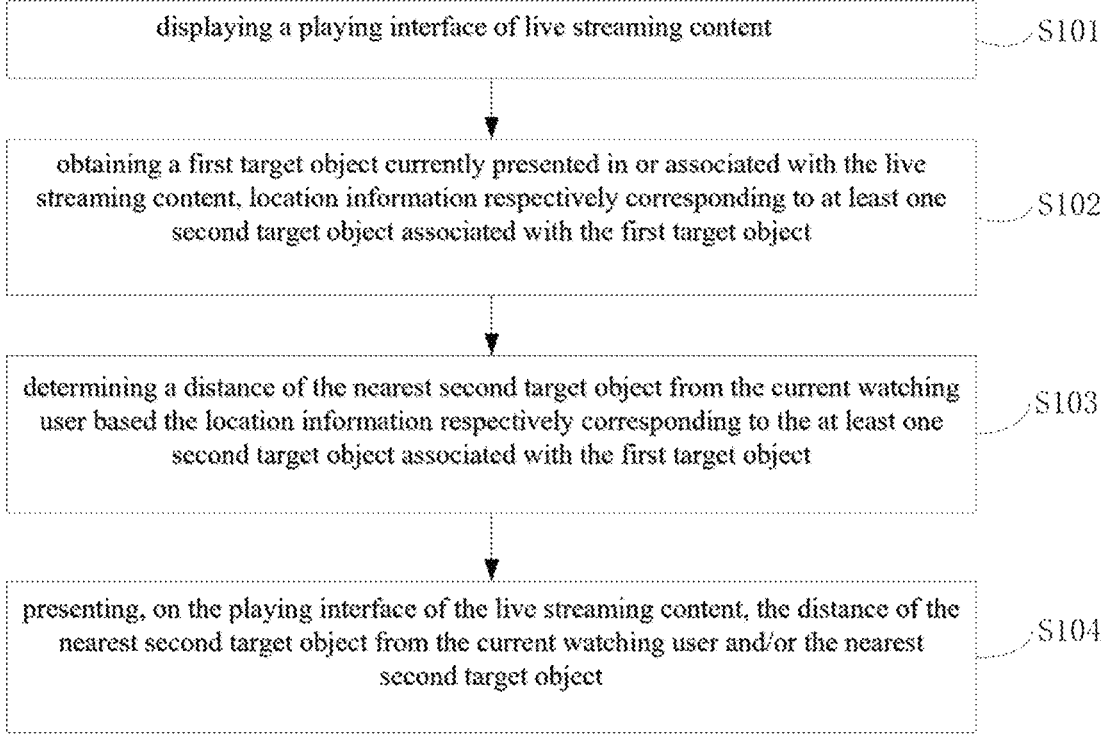
FIG. 1 is a flowchart of a live streaming content display method provided in embodiments of the present disclosure.

In order to better understand the above objectives, features, and advantages of the present disclosure, further descriptions of the disclosed solutions will be given below. It should be noted that if there are no conflicts, the embodiments disclosed herein and the features in the embodiments can be combined with each other.

Many specific details are elaborated in the following descriptions to facilitate a thorough understanding of the present disclosure, but the present disclosure may be implemented in other ways different from those described herein; obviously, the embodiments in this description are only a part of, rather than all of, the embodiments of the present disclosure.

Currently, there is an urgent technical problem that needs to be solved: how to meet the diverse demands of users for presenting a live streaming interface.

In the related art, some live rooms will give watching users an offline store shopping experience in live and provide a purchasing entrance such as a group buying link to watching users. In a case where a user has agreed to authorize accessing of his or her geographical location, the current live streaming interface will also present distance information between the streamer and a watching user. However, in some cases, there are multiple applicable stores for group buying products, and the presentation of the distance between the streamer and the watching user on the live streaming interface may make the watching user think that the applicable stores for the group buying are far away.

In order to enhance the effectiveness of information presentation on the live streaming interface, the embodiments of the present disclosure provide a live streaming content display method.

Specifically, initially, a playing interface of live streaming content is displayed, and then a first target object currently presented in or associated with the live streaming content, location information respectively corresponding to at least one second target object associated with the first target object are obtained. The location information of a current watching user may also be obtained. It should be appreciated that throughout the present disclosure, the location information of a user (e.g., the current watching user) is obtained when the user has agreed to authorize accessing of his or her geographical location. Further, based on the location information respectively corresponding to the at least one second target object associated with the first target object, the distance between the current watching user and a nearest second target object is determined; wherein the nearest second target object is a second target object located closest to the current watching user among the at least one second target object associated with the first target object. Specifically, the distance between the nearest second target object and the current watching user may be determined based on the location information of the current watching user and the location information respectively corresponding to the at least one second target object. Next, on the playing interface of the live streaming content, the distance between the current watching user and the nearest second target object and/or the nearest second target object is presented.

It can be seen that the embodiments of the present disclosure can present, on the playing interface of the live streaming content, relevant information of the second target object associated with the first target object and located closest to the current watching user, to enhance the effectiveness of the information presentation on the live streaming interface.

Based on this, the embodiments of the present disclosure provide a live streaming content display method. With reference to FIG. 1, which is a flowchart of a live streaming content display method provided in embodiments of the present disclosure, the method comprises the following steps.

S101: displaying a playing interface of live streaming content.

The playing interface of the live streaming content in the embodiments of the present disclosure can be a live room interface or a preview interface of the live streaming content. The preview interface of the live streaming content can be configured to present a preview screen of the live streaming content before entering the live room interface.

S102: Obtaining a first target object currently presented in or associated with the live streaming content, location information respectively corresponding to at least one second target object associated with the first target object.

In the embodiments of the present disclosure, the first target object currently presented in the live streaming content can be the object being introduced in the live streaming content, such as a local service object or product object being introduced, for example, it can include food, etc. In addition, the first target object associated with the live streaming content can be an object that sets a binding relationship with a live room corresponding to the live streaming content in advance, and in particular can also include a local service object or product object, etc.

In the embodiments of the present disclosure, during the process of presenting the live streaming content on the playing interface of the live streaming content, the first target object currently presented in or associated with the live, such as object A, is obtained, and the location information respectively corresponding to at least one second target object associated with the first target object is obtained. For example, the at least one second target object associated with object A may include at least one store corresponding to object A. In addition, in a case where a user has agreed to authorize accessing of his or her geographical location, the location information of the current watching user can also be obtained, wherein the location information in the present embodiment can be longitude and latitude coordinate information, etc.

S103: determining the distance of a nearest second target object from the current watching user based on the location information respectively corresponding to the at least one second target object associated with the first target object.

The nearest second target object is a second target object located closest to the current watching user among the at least one second target object associated with the first target object.

In the embodiments of the present disclosure, after the location information of the current watching user and the respective location information corresponding to each second target object associated with the first target object are obtained, the distances between the current watching user and each second target object are calculated respectively, and the second target object with the shortest distance to the current watching user is determined as the nearest second target object.

In the embodiments of the present disclosure, after the distances between the current watching user and each second target object are calculated, the distance between the current watching user and the nearest second target object is determined, that is, the shortest one among the distances between each second target object and the current watching user.

S104: presenting, on the playing interface of the live streaming content, the distance between the current watching user and the nearest second target object and/or the nearest second target object.

As the current watching user is interested in the first target object currently presented in or associated with the live streaming content, he/she will be more likely to concern about a second target object associated with the first target object located relatively close to him/her, and the location information thereof. Therefore, in the embodiments of the present disclosure, the distance between the current watching user and the nearest second target object is presented on the playing interface of the live streaming content to help the provision of effective information related to the first target object to the current watching user.

In addition, in the embodiments of the present disclosure, the second target object located closest to the current watching user can also be presented on the playing interface of the live streaming content, so that the current watching user can perceive the nearest second target object.

In addition, in the embodiments of the present disclosure, the number of the second target objects associated with the first target object can be presented on the playing interface of the live streaming content, so that the watching user can make a selection from a plurality of second target objects.

In addition, in the embodiments of the present disclosure, the address information respectively corresponding to each second target object associated with the first target object, the distance thereof from the current watching user, and so on can also be presented on the playing interface of the live streaming content.

Figure 2:
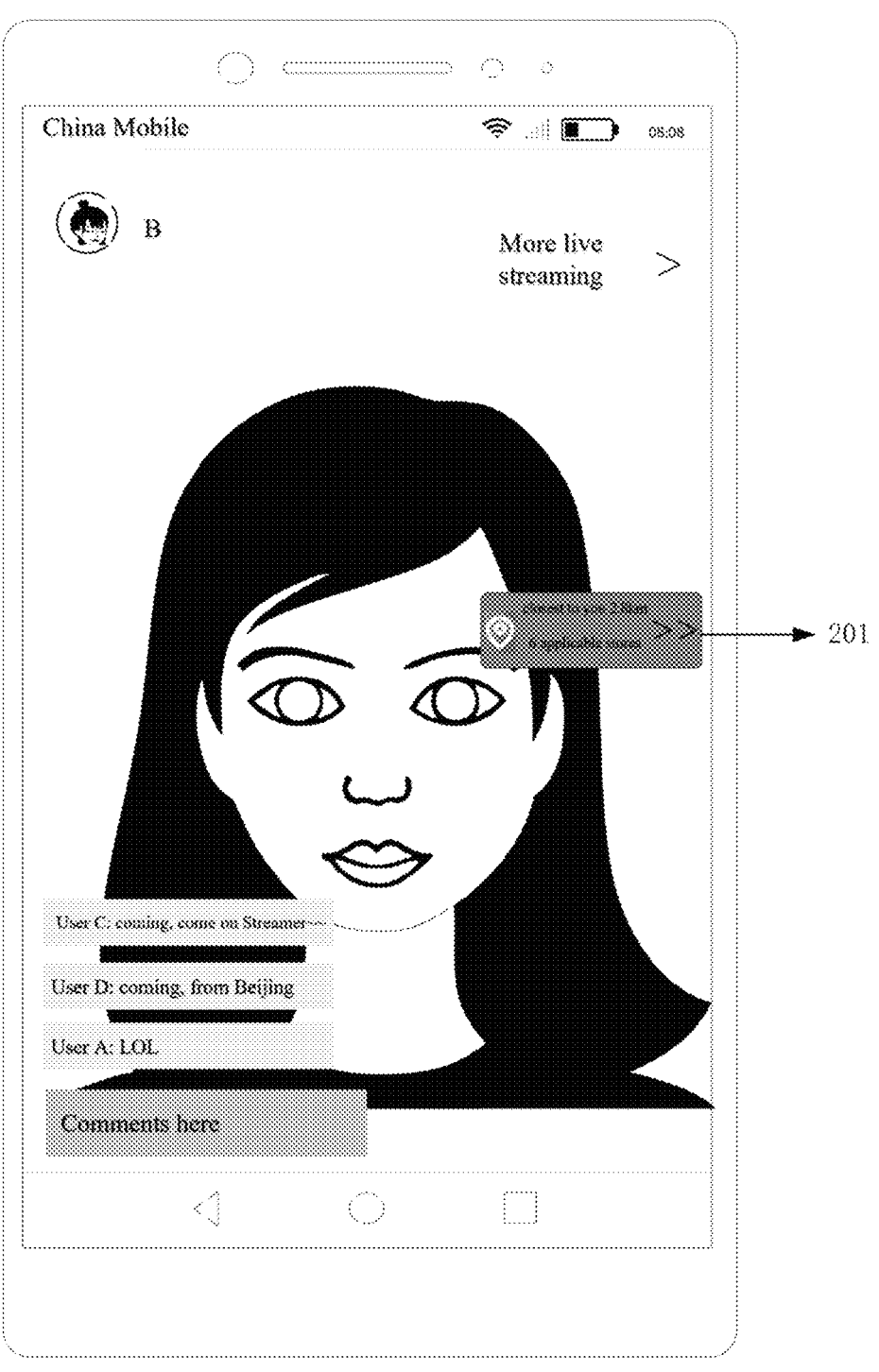
FIG. 2 is a schematic view of a live streaming channel interface provided in embodiments of the present disclosure.

In an optional implementation, the playing interface of the live streaming content can be a live room interface, as shown in FIG. 2 which is a schematic view of a live room interface of live streaming content provided in embodiments of the present disclosure, wherein the distance between the current watching user and the nearest second target object is presented on the live room interface. More specifically, the embodiments of the present disclosure do not limit the position on the live room interface of presenting the distance between the current watching user and the nearest second target object.

In another optional implementation, the distance between the current watching user and the nearest second target object and/or the nearest second target object can be presented on a first control 201 preset on the playing interface of the live streaming content. As shown in FIG. 2 above, the distance between the current watching user and the nearest second target object is presented on the first control 201.

In a practical application, by triggering the first control 201, the distance between the current watching user and the at least one second target object associated with the first target object, and the corresponding location information of the second target object, can be presented on the playing interface of the live streaming content.

Figure 3:
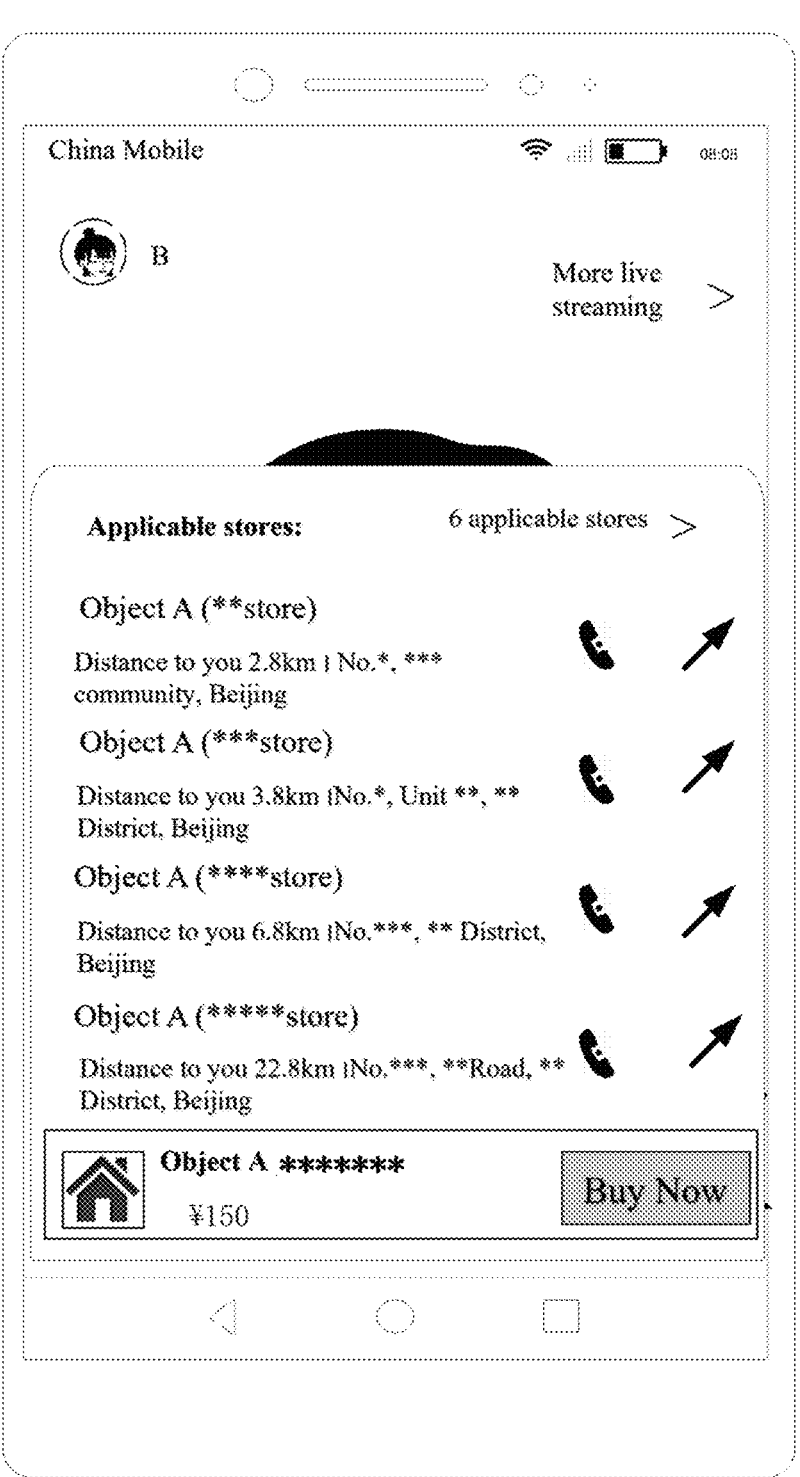
FIG. 3 is a schematic view of a playing interface of live streaming content provided in embodiments of the present disclosure.

FIG. 3 shows a schematic view of a playing interface of live streaming content provided in embodiments of the present disclosure. Upon receiving a triggering operation on the first control shown in FIG. 2 above, a semi-popup window is displayed on the playing interface of the live streaming content, and the respective distances between the current watching user and each second target object associated with the first target object, as well as the location information of each second target object, are presented on this semi-popup window. The location information of the second target object can be the address information of the second target object, etc. In addition, the name of each second target object can also be presented on the semi-popup window.

In an optional implementation, in order to improve the efficiency of the current watching user in locating the nearest second target object on the interface shown in FIG. 3, the distances between the current watching user and each second target object, and the corresponding location information of the second target object, can be presented in an ascending order of distance, so that the second target object with the shortest distance to the current watching user can be located at the first place of the semi-popup window.

In the live streaming content display method provided in the embodiments of the present disclosure, firstly, a playing interface of live streaming content is displayed, and then a first target object currently presented in the live streaming content or associated with the live streaming content, location information respectively corresponding to at least one second target object associated with the first target object are obtained. Further, the distance between the current watching user and the nearest second target object is determined based on the location information respectively corresponding to the at least one second target object associated with the first target object; wherein, the nearest second target object is a second target object located closest to the current watching user among the at least one second target object associated with the first target object. Next, on the playing interface of the live streaming content, the distance of the nearest second target object from the current watching user and/or the nearest second target object is presented. It can be seen that the embodiments of the present disclosure can present, on the playing interface of the live streaming content, the relevant information of the second target object associated with the first target object located closest to the current watching user, to enhance the effectiveness of the information presentation on the live streaming interface.

In an optional implementation, a second target object corresponding to a target streamer and/or the distance between the second target object and the current watching user can also be presented on the playing interface of the live streaming content, wherein the target streamer is the user who initiates the live streaming content.

In a practical application, the target streamer can initiate live streaming content at any one of the second target objects associated with the first target object. At this time, on the playing interface of the live streaming content, the current watching user of the live streaming content can browse the distance between the second target object where the target streamer is located and the current watching user, as well as the address information, the name of the second target object, etc.

In an optional implementation, since the same live streaming content can be associated with or present multiple objects, when it is determined that an object currently presented in or associated with the live streaming content is switched from the first target object to a third target object, the distance between the current watching user and a nearest fourth target object associated with the third target object, and/or the nearest fourth target object can be presented on the playing interface of the live streaming content. Specifically, the address information, the name, etc. of the nearest fourth target object can also be presented on the playing interface of the live streaming content.

For example, if the object currently presented in the live streaming content is switched from object A to object B, then the distance between the current watching user and a nearest store associated with object B, as well as the address information, the name, etc. of the nearest store can be presented on the playing interface of the live, so that the current t watching user can perceive the location information of the object currently presented in the live streaming content in real time.

It should be noted that the user's location information in the embodiments of the present disclosure is obtained and used under the premise of obtaining user's location authorization and complying with relevant laws and regulations.

Figure 4:
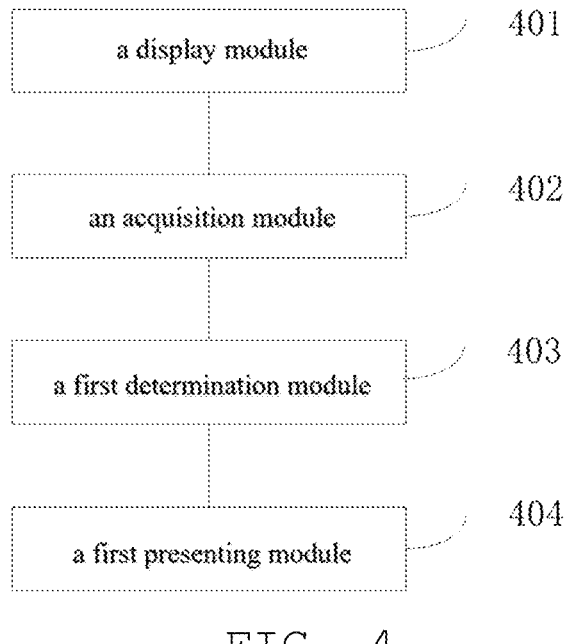
FIG. 4 is a structural schematic view of a display apparatus for live streaming content provided in embodiments of the present disclosure.

Based on the same inventive concept as the above embodiments, the embodiments of present disclosure further provide a display apparatus for live streaming content. Referring to FIG. 4 which is a structural schematic view of a display apparatus for live streaming content provided in embodiments of the present disclosure, the apparatus comprises: a display module 401 for displaying a playing interface of live streaming content; a first acquisition module 402 for obtaining a first target object currently presented in or associated with the live streaming content, location information respectively corresponding to at least one second target object associated with the first target object; a first determination module 403 for determining the distance between the current watching user and a nearest second target object based on the location information respectively corresponding to the at least one second target object associated with the first target object; wherein, the nearest second target object is a second target object located closest to the current watching user among the at least one second target object associated with the first target object; a first presenting module 404 for presenting the distance between the current watching user and the nearest second target object and/or the nearest second target object on the playing interface of the live streaming content.

In an optional implementation, the apparatus further comprises: a second presenting module for presenting the distance between the current watching user and a nearest fourth target object associated with a third target object and/or the nearest fourth target object on the playing interface of the live streaming content when it is determined that an object currently presented in or associated with the live streaming content is switched from the first target object to a third target object.

In an optional implementation, the first presenting module is specifically configured to present the distance between the current watching user and the nearest second target object and/or the nearest second target object on a first control preset on the playing interface of the live streaming content.

In an optional implementation, the apparatus further comprises: a third presenting module for presenting, in response to a triggering operation on the first control, the distance between the current watching user and the at least one second target object associated with the first target object, as well as the corresponding location information of the second target object on the playing interface of the live streaming content.

In an optional implementation, the third presenting module is specifically configured to present, in an ascending order of distance, the distance between the current watching user and the at least one second target object associated with the first target object, as well as the corresponding location information of the second target object, on the playing interface of the live streaming content.

In an optional implementation, the first presenting module is specifically configured to present the distance between the current watching user and the nearest second target object and/or the nearest second target object on a live room interface or a preview interface of the live streaming content.

In an optional implementation, the apparatus further comprises: a fourth presenting module for presenting the number of the second target objects associated with the first target object on the playing interface of the live streaming content.

In an optional implementation, the apparatus further comprises: a fifth presenting module for presenting a target object corresponding to a target streamer and/or the distance between the second target object and the current watching user on the playing interface of the live streaming content; wherein the target streamer includes a user who initiates the live streaming content.

In the display apparatus for live streaming content provided in the embodiments of the present disclosure, firstly, a playing interface of live streaming content is displayed, and then a first target object currently presented in or associated with the live streaming content, location information respectively corresponding to at least one second target object associated with the first target object are obtained. Further, the distance between the current watching user and the nearest second target object is determined based on the location information respectively corresponding to the at least one second target object associated with the first target object; wherein, the nearest second target object is a second target object located closest to the current watching user among the at least one second target object associated with the first target object. Next, on the playing interface of the live streaming content, the distance between the current watching user and the nearest second target object and/or the nearest second target object is presented. It can be seen that the embodiments of the present disclosure can present, on the playing interface of the live streaming content, the relevant information of the second target object associated with the first target object located closest to the current watching user, to enhance the effectiveness of the information present on the live streaming interface.

In addition to the above-mentioned method and device, the embodiments of the present disclosure further provide a non-transitory computer-readable storage medium with instructions stored therein which, when being executed on a terminal device, cause the terminal device to implement the live streaming content display method as described in the embodiments of the present disclosure.

The embodiments of the present disclosure further provide a computer program product comprising computer programs/instructions which, when executed by a processor, implement the live streaming content display method as described in the embodiments of the present disclosure.

Figure 5:
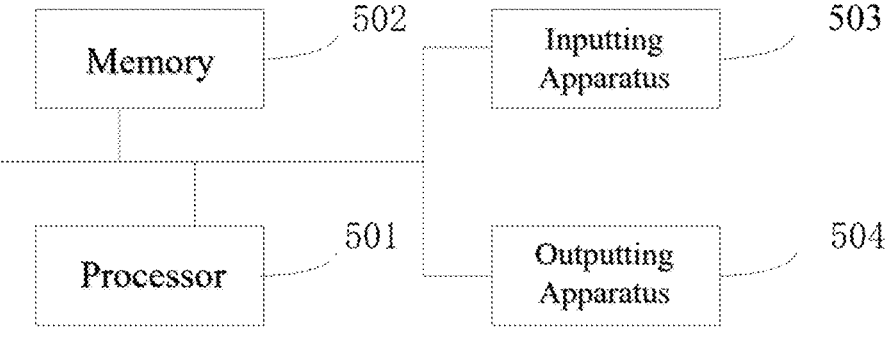
FIG. 5 is a structural schematic view of a display device for live streaming content provided in embodiments of the present disclosure.

In addition, the embodiments of the present disclosure further provide a display device for live streaming content, as shown in FIG. 5, which may comprise: a processor 501, a memory 502, an input apparatus 503, and an output apparatus 504. The number of the processors 501 in the display device for live streaming content can be one or more, while FIG. 5 shows an example having one processor. In some embodiments disclosed herein, the processor 501, the memory 502, the input apparatus 503, and the output apparatus 504 can be connected via a bus or other means, whereas FIG. 5 shows an example of being connected via a bus.

The memory 502 can be used to store software programs and modules, and the processor 501 can execute the software programs and modules stored in the memory 502 to perform various functional applications and data processing of the display device for live streaming content. The memory 502 may mainly include a program store and a data store, wherein the program store can store an operating system, an application program required by at least one function, etc. Furthermore, the memory 502 may include a high-speed random access memory and may further include a non-volatile memory, such as at least one disk storage device, flash memory device, or other volatile solid-state storage device. The input apparatus 503 can be used to receive input numerical or character information, and generate signal inputs related to user settings and functional control of the display device for live streaming content.

Specifically in the present embodiment, the processor 501 will load executable files corresponding to one or more processes of application programs into the memory 502 according to the following instructions, and the processor 501 will run the application programs stored in the memory 502, thereby realizing various functions of the aforementioned display device for live streaming content.

It should be noted that, relational terms such as "first" and "second" herein are only used to distinguish one entity or operation from another entity or operation, and do not necessarily require or imply any actual relationship or order between these entities or operations. Moreover, the terms "comprise", "include", or any other variation thereof are intended to encompass nonexclusive inclusion, such that a process, method, item, or device including a series of elements not only includes the mentioned elements, but also includes other elements that are not explicitly listed, or also includes elements inherent to such process, method, item, or device. If without further limitations, the elements limited by the statement "comprising a . . . " do not exclude the existence of other identical elements in the process, method, item, or device that includes said elements.

All above are only specific implementations of the present disclosure, which enable those skilled in the art to understand or implement this disclosure. Various modifications to these embodiments will be apparent to those skilled in the art, and the general principles defined herein can be implemented in other embodiments without departing from the spirit or scope of this disclosure. Therefore, this disclosure will not be limited to the embodiments described herein, but will conform to the broadest scope consistent with the principles and novel features disclosed herein.

What is claimed is:

1. A live streaming content display method, comprising:
in response to an instruction to display a playing interface of live streaming content:
determining a first target object currently presented in or associated with the live streaming content and at least one second target object associated with the first target object, wherein the first target object comprises a local service object for which a purchase order can be placed online, and the at least one second target object comprises a plurality of applicable stores corresponding to the local service object;
obtaining location information respectively corresponding to the at least one second target object;
determining a distance of a nearest second target object from a current watching user based on the location information respectively corresponding to the at least one second target object, wherein the nearest second target object is a second target object closest to the current watching user among the at least one second target object;
presenting, on the playing interface of the live streaming content, the live streaming content and a first control, wherein on the first control, the number of the at least one second target object and the distance of only the nearest second target object from the current watching user, other than distances of all of the at least one second target object from the current watching user are presented simultaneously; and
in response to a triggering operation based on the playing interface or the first control on the basis of presenting the first control, presenting, on the playing interface of the live streaming content, a single purchase entrance for placing the purchase order for the local service object with the plurality of applicable stores.

2. The method according to claim 1, further comprising:
when it is determined that an object currently presented in or associated with the live streaming content is switched from the first target object to a third target object, presenting at least one of the following on the playing interface of the live streaming content:
a distance of a nearest fourth target object associated with the third target object from the current watching user; or
the nearest fourth target object.

3. The method according to claim 1, wherein the presenting the distances of the at least one second target object associated with the first target object from the current watching user and the corresponding location information of the at least one second target object on the playing interface of the live streaming content, comprises:
presenting the distances of the at least one second target object associated with the first target object from the current watching user, and the corresponding location information of the at least one second target object, on the playing interface of the live streaming content, in an ascending order of distance.

4. The method according to claim 1, wherein the presenting, on the playing interface of the live streaming content, at least one of the following: the distance of the nearest second target object from the current watching user; or the nearest second target object, comprises:

presenting, on a live room interface or a preview interface of the live streaming content, at least one of the following:

the distance of the nearest second target object from the current watching user; or the nearest second target object.

5. The method according to claim 1, further comprising:

determining another second target object among the at least one second target object at which a user has initiated the live streaming content; and presenting, on the playing interface of the live streaming content, the live streaming content, at least one of the following:

the distance of the nearest second target object from the current watching user; or the nearest second target object, and at least one of the following:

the other second target object; or a distance of the other second target object from the current watching user.

6. A non-transitory computer-readable storage medium with instructions stored thereon which, when being executed on a terminal device, cause the terminal device to:

in response to an instruction to display a playing interface of live streaming content:

determine a first target object currently presented in or associated with the live streaming content and at least one second target object associated with the first target object, wherein the first target object comprises a local service object for which a purchase order can be placed online, and the at least one second target object comprises a plurality of applicable stores corresponding to the local service object;

obtain location information respectively corresponding to the at least one second target object;

determine a distance of a nearest second target object from a current watching user based on the location information respectively corresponding to the at least one second target object, wherein the nearest second target object is a second target object closest to the current watching user among the at least one second target object; and present, on the playing interface of the live streaming content, the live streaming content and a first control, wherein on the first control the number of the at least one second target object and the distance of only the nearest second target object from the current watching user, other than distances of all of the at least one second target object from the current watching user are presented simultaneously; and in response to a triggering operation based on the playing interface or the first control on the basis of presenting the first control, present, on the playing interface of the live streaming content, a single purchase entrance for placing the purchase order for the local service object with the plurality of applicable stores.

7. The non-transitory computer-readable storage medium according to claim 6, the instructions further cause the terminal device to:

when it is determined that an object currently presented in or associated with the live streaming content is switched from the first target object to a third target object, present at least one of the following on the playing interface of the live streaming content:

a distance of a nearest fourth target object associated with the third target object from the current watching user; or the nearest fourth target object.

8. The non-transitory computer-readable storage medium according to claim 6, wherein to present, on the playing interface of the live streaming content, at least one of the following: the distance of the nearest second target object from the current watching user; or the nearest second target object, the instructions further cause the terminal device to:

present, on a live room interface or a preview interface of the live streaming content, at least one of the following:

the distance of the nearest second target object from the current watching user; or the nearest second target object.

9. The non-transitory computer-readable storage medium according to claim 6, the instructions further cause the terminal device to:

determine another second target object among the at least one second target object at which a user has initiated the live streaming content; and present, on the playing interface of the live streaming content, the live streaming content, at least one of the following:

the distance of the nearest second target object from the current watching user; or the nearest second target object, and at least one of the following:

the other second target object; or a distance of the other second target object from the current watching user.

10. A device, comprising:

a memory, a processor, and a computer program stored in the memory and executable on the processor which, when executed by the processor, implement the following operations:

in response to an instruction to display a playing interface of live streaming content:

determining a first target object currently presented in or associated with the live streaming content and at least one second target object associated with the first target object, wherein the first target object comprises a local service object for which a purchase order can be placed online, and the at least one second target object comprises a plurality of applicable stores corresponding to the local service object;

obtaining location information respectively corresponding to the at least one second target object;

determining a distance of a nearest second target object from a current watching user based on the location information respectively corresponding to the at least one second target object, wherein the nearest second target object is a second target object closest to the current watching user among the at least one second target object;

presenting, on the playing interface of the live streaming content, the live streaming content and a first control, wherein on the first control, the number of the at least one second target object and the distance of only the nearest second target object from the current watching user, other than distances of all of the at least one second target object from the current watching user are presented simultaneously; and in response to a triggering operation based on the playing interface or the first control on the basis of presenting the first control, presenting, on the playing interface of the live streaming content, a single purchase entrance for placing the purchase order for the local service object with the plurality of applicable stores.

11. The device according to claim 10, the operations further comprising:

when it is determined that an object currently presented in or associated with the live streaming content is switched from the first target object to a third target object, presenting at least one of the following on the playing interface of the live streaming content:

a distance of a nearest fourth target object associated with the third target object from the current watching user; or the nearest fourth target object.

12. The device according to claim 10, wherein the presenting, on the playing interface of the live streaming content, at least one of the following: the distance of the nearest second target object from the current watching user; or the nearest second target object, comprises:

presenting, on a live room interface or a preview interface of the live streaming content, at least one of the following:

the distance of the nearest second target object from the current watching user; or the nearest second target object.

13. The device according to claim 10, the operations further comprising:

determining another second target object among the at least one second target object at which a user has initiated the live streaming content; and presenting, on the playing interface of the live streaming content, the live streaming content, at least one of the following:

the distance of the nearest second target object from the current watching user; or the nearest second target object, and at least one of the following:

the other second target object; or a distance of the other second target object from the current watching user.

* * * * *